Patented Dec. 17, 1935

2,024,651

UNITED STATES PATENT OFFICE 2,024,651

PREPARATION OF CELLULOSE ACETATE ISOBUTYRATE

Carl J. Malm, Rochester, N. Y., and Charles L. Fletcher, Kingsport, Tenn., assignors to Eastman Kodak Company, Rochester, N. Y., a corporation of New York No Drawing. Application April 21, 1933,
Serial No. 667,308

5 Claims. (Cl. 260—101)

The present invention relates to the preparation of cellulose acetate isobutyrate in which the proportion of iso-butyryl to acetyl in the esterification bath is such that the ester formed will be insoluble therein.

Heretofore, in the preparation of organic esters of cellulose by a fibrous process, it has been necessary to have present, in addition to the usual esterification ingredients, an inert non-solvent to convert the bath to a non-solvent of the cellulose ester which is formed therein. This led to many problems occasioned by the great bulkiness inherent in a mixture which is rendered non-solvent by the addition of an inert non-solvent thereto, and the difficulties involved in recovering the fatty acid compounds from the spent esterification mixture after the cellulose ester has been removed therefrom. The inert non-solvents ordinarily employed have a high vapor pressure compared to the fatty acid compounds employed, so that unless precautions are taken some of the non-solvent will vaporize. Even if the loss of liquid in this manner should not be serious, its presence in the air in gaseous form would constitute a nuisance either from a physiological or from a fire hazard standpoint, or both.

In the case of the use of some non-solvents, such as benzol or carbon tetrachloride, in fibrous esterification processes, the use of perchloric acid as a catalyst is difficult if not impossible due to the insolubility of perchloric acid in those non-solvents.

One object of our invention is to provide a process of making an organic acid ester of cellulose by a fibrous process in which no inert non-solvent needs to be added to the esterification bath. Another object of our invention is to provide a fibrous process for the preparation of an organic acid ester of cellulose in which no problem of recovery of the fatty acid compounds in the spent esterification liquor, from foreign material, is presented. Another object of our invention is to provide a fibrous process for the preparation of an organic acid ester of cellulose in which all the ingredients of the bath are sufficiently soluble in water, so that only a water wash of the ester formed is necessary to remove all the esterification liquids therefrom.

We have found that when cellulose or a cellulose ester having free and available hydroxyl groups is esterified in a bath containing the proper proportion of isobutyryl to acetyl groups, a cellulose acetate isobutyrate is formed which is insoluble in the reaction mixture. It is necessary to regulate the isobutyryl content of the bath in accordance with the starting material employed. For instance, if cellulose is employed as the starting material, it is necessary that there be present enough isobutyryl groups to render the bath non-solvent of the resulting cellulose acetate-isobutyrate and on the other hand, if the isobutyryl content is too great the ester which will be formed will have such a large isobutyryl content that it will possess increased solubility characteristics. In such a case, it might exhibit solubility in the reaction mixture even though that mixture has a large isobutyryl content. Therefore, it is desirable, to assure insolubility, that the esterification bath contain approximately 60–80% of isobutyryl groups based on the total acyl content, the remainder, of course, being acetyl.

In the case where an esterifiable cellulose ester (such as the ordinary commercial acetone-soluble cellulose acetate) is employed as the starting material, the isobutyryl content of the bath may be approximately from 50–100% isobutyryl based on total acyl as there is already an appreciable content of acetyl present in the ester and the danger of preparing an ester having too large an isobutyryl content for insolubility in the bath is negligible.

The isobutyryl and acetyl groups in the esterification bath may be supplied by the corresponding acids and/or anhydrides thereof. For example, the reaction mixture may be composed of isobutyric acid and acetic anhydride, isobutyric anhydride and acetic acid, isobutyric acid and a mixture of the two anhydrides or other combinations which result when the ingredients come to equilibrium in a bath containing isobutyric anhydride, isobutyric acid, acetic anhydride and acetic acid.

Our invention comprises reacting upon cellulose or cellulose having free and esterifiable hydroxyl groups with an esterification bath containing at least approximately 50% of isobutyryl groups based on the total acyl content, the remainder of the acyl being acetyl. The following examples illustrate processes embodying our invention.

Example I 50 lbs. of cotton linters were treated with 400 lbs. of acetic acid for three hours at 150° F. At the end of this time, they were centrifuged, leaving 20 lbs. of acetic acid in the fiber and added to a mixture of 150 lbs. of 85% acetic anhydride, 330 lbs. of isobutyric acid and 1 lb. of sulfuric acid, which mixture was precooled to 60° F. The mass was maintained at 70–120° F. for about 15 hours. The fibrous product was separated off, washed and dried. It was found to be soluble in acetone. Analysis showed the product contained 48.6% isobutyryl based on the total acyl content of the ester, the remaining 51.4% being acetyl.

*Example II*

50 lbs. of cotton linters were treated with 195 lbs. of acetic acid for 3 hours at 150° F. The mixture was then cooled to 70° F. and a mixture of 350 lbs. of isobutyric anhydride and 1 lb. of sulfuric acid was added thereto. The mass was kept at 70–120° F. for about 15 hours and the fibrous product was then separated from the esterification bath, washed and dried. It was found to be acetone-soluble and to have a content of 53.5% isobutyryl based on the total acyl content, the remainder, 46.5%, being acetyl.

*Example III*

75 lbs. of hydrolyzed cellulose acetate, having an acetyl content of about 35–40%, were added to a mixture comprising 400 lbs. of isobutyric acid, 100 lbs. of isobutyric anhydride and a small amount of sulfuric acid (less than a pound) and the whole was maintained at approximately 100° F. for about 12 hours. The cellulose acetate isobutyrate formed retained the physical form of the original cellulose acetate. It was separated off, washed free of esterifying reagents with water, and dried.

At the end of the esterification carried out in accordance with our invention, the excess reaction mixture can be removed from the product by centrifuging and the residual acetic and isobutyric acid remaining can be removed by counter-current washing with water, isobutyric acid being soluble in water to the extent of 20% at 20° C.

The acetic acid may then be neutralized, as for instance with sodium carbonate, and the resulting solution of sodium acetate may then be employed for the manufacture of acetic anhydride. Obviously, the recovery of the acids from the spent esterification liquor may be carried out in other ways, if desired by the individual operator.

In the present process, when a cellulose ester such as hydrolyzed cellulose acetate or a hydrolyzed cellulose acetate propionate in which the propionyl groups are not present in an amount sufficient to cause solubility, is employed as the starting material, it may be in the form of threads, fibers, textiles, film or any like form, if desired. Whatever the original form, that form will be retained in the esterification process carried out in accordance with our invention.

If one desires, in the carrying out of the present invention, to prepare a cellulose acetate isobutyrate having a predetermined isobutyryl content from cellulose, he may ascertain the proportion of isobutyryl needed in the esterification bath from the invention of Malm and Nadeau disclosed in their application Serial No. 659,698 filed March 6, 1933. This selection, however, must be within the limits of approximately 60–80% isobutyryl to total acyl in the esterification bath to retain fibrous esterification conditions. As was pointed out in that application, the esters produced by esterifying cellulose in an esterification bath containing 60–80% higher acyl based on total acyl are soluble in:

Tetrachlorethane, methylene chloride-ethyl alcohol (9:1), chloroform-ethyl alcohol (85:15), ethylene chloride-methyl alcohol (9:1), ethylene chloride, acetone, methyl acetate, BB' dichlorethyl ether-methyl alcohol (4:1), ethyl acetate, propylene chloride-methyl alcohol (9:1), trichlorethylene-methyl alcohol (9:1), BB' dichlorethyl ether, methyl ethyl ketone.

As may be observed from the data in that Malm and Nadeau application, the cellulose acetate isobutyrates prepared from cellulose in a bath containing from 60–80% isobutyryl based on total acyl groups will have an isobutyryl content of approximately 44–66%, based on the total acyl content of the ester. When 70% isobutyryl based on the total acyl is present in the esterification bath, the cellulose acetate isobutyrate formed will contain approximately 55% of isobutyryl based on the total acyl content of the ester.

It may thus be seen that the present invention not only has the advantages set out before, but also that the products resulting therefrom have wide and varied solubilities which suggest numerous possibilities such as in the manufacture of sheets or films, artificial silk, artificial leather, molded products, etc.

As was pointed out above a hydrolyzed cellulose acetate propionate or acetate butyrate which does not contain an amount of the higher acyl groups sufficient to avoid insolubility may be employed in the present process. Also, where cellulose is employed as the starting material, a small amount of propionic or butyric acid or anhydride may be present in the esterification bath. However, this amount must be less than that which will adversely affect the fibrous feature of the bath. Where the term "acetylated" cellulose is employed herein, it is to be understood as referring not only to cellulose acetate but also to mixed esters such as cellulose acetate propionate, cellulose acetate butyrate, etc. which contain substantial proportions of acetyl groups therein.

What we claim as our invention and desire to have secured by Letters Patent in the United States is:

1. A process of preparing cellulose acetate isobutyrate in fibrous form which comprises reacting upon cellulose with an esterification bath which is rendered non-solvent of the cellulose acetate isobutyrate formed therein by the presence of approximately 60–80% isobutyryl based on the total acyl content, the remainder of the acyl content being acetyl.

2. A process of preparing cellulose acetate isobutyrate in fibrous form which comprises reacting upon cellulose with an esterification bath comprising isobutyric acid, acetic acid and acetic anhydride in which 60–80% of the total acyl content present is isobutyryl which renders the bath non-solvent of the cellulose acetate isobutyrate formed therein.

3. A processs of preparing cellulose acetate isobutyrate in fibrous form which comprises reacting upon an acetylated cellulose having free and esterifiable hydroxyl groups with an esterification bath which is rendered non-solvent of the cellulose acetate isobutyrate formed therein by the presence of at least 50% of isobutyryl based on the total acyl content of the bath.

4. A process of preparing cellulose acetate isobutyrate in fibrous form which comprises reacting upon cellulose or an acetylated cellulose having free and esterifiable hydroxyl groups with an esterification bath containing a quantity of isobutyric acid or isobutyric acid anhydride which, in addition to entering into the esterification, will render the bath non-solvent, the bath also containing a source of acetyl groups when cellulose is employed as the starting material.

5. A process of preparing cellulose acetate isobutyrate in fibrous form which comprises reacting upon cellulose with an esterification bath containing acetyl groups and a quantity of isobutyric acid or isobutyric anhydride which, in addition to entering into the esterification, will render the bath non-solvent.

CARL J. MALM.
CHARLES L. FLETCHER.